(12) United States Patent
Jin et al.

(10) Patent No.: US 10,735,715 B2
(45) Date of Patent: Aug. 4, 2020

(54) AUTOSTEREOSCOPIC 3-DIMENSIONAL DISPLAY

(71) Applicant: LG DISPLAY CO., LTD., Seoul (KR)

(72) Inventors: Youyong Jin, Seoul (KR); Byungjoo Lee, Seoul (KR); Wonsik Lee, Busan (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/826,206

(22) Filed: Nov. 29, 2017

(65) Prior Publication Data

US 2018/0152696 A1    May 31, 2018

(30) Foreign Application Priority Data

Nov. 30, 2016   (KR) .................. 10-2016-0162358

(51) Int. Cl.
*G02B 27/22* (2018.01)
*H04N 13/317* (2018.01)
*H04N 13/305* (2018.01)

(52) U.S. Cl.
CPC ......... *H04N 13/317* (2018.05); *H04N 13/305* (2018.05)

(58) Field of Classification Search
CPC ..... H04N 13/04; H04N 13/0404–0406; H04N 13/0409; H04N 13/0497; H04N 13/0239; H04N 13/0055; H04N 13/0296; H04N 13/0431; H04N 13/0242; H04N 13/0048; H04N 13/021; H04N 13/0221; H04N 13/0037; H04N 13/0051; H04N 13/044; H04N 13/0438; H04N 13/0003; H04N 13/0422; H04N 13/0434; H04N 13/0459; H04N 13/317; H04N 13/305; H04N 9/3197; H04N 9/3105; G02B 27/22; G02B 27/2214; G02B 27/2228; G02B 27/2257; G02B 27/2235; G02B 27/225; G02B 27/2264; G02B 27/017; G02B 27/26; G02B 27/44; G02B 27/46; G02B 27/4211; G02B 27/143–145; G02B 27/106; G02B 5/32; G02B 5/0252; G02B 5/203; G02B 5/1814;

(Continued)

(56) References Cited

U.S. PATENT DOCUMENTS 8,917,441 B2 * 12/2014 Woodgate .......... G02B 27/2214
                                                  359/298
9,223,141 B2 * 12/2015 Hamagishi ......... G02B 27/2214
(Continued)

FOREIGN PATENT DOCUMENTS

WO    WO 2015/198606 A1    12/2015

*Primary Examiner* — Stephone B Allen
*Assistant Examiner* — Jyotsna V Dabbi
(74) *Attorney, Agent, or Firm* — Birch, Stewart, Kolasch & Birch, LLP

(57) ABSTRACT

An autostereoscopic three-dimensional (3D) display, in which a multi view structure is configured by using a lenticular lens, includes a display panel including a plurality of pixels, and an aperture area disposed at each pixel; and a lens film disposed on a front surface of the display panel and including a plurality of lenticular lenses, the lenticular lenses having a slanted axis and continuously arrayed along to a lateral direction, in which the aperture area includes a parallelogram shape, and the slanted axis is parallel with any one diagonal axis of the aperture area.

8 Claims, 7 Drawing Sheets

(58) Field of Classification Search
CPC .. G02B 5/1866; G02B 5/1871; G02B 5/1876; G02B 5/1857; G02B 5/285; G02B 1/113; G02B 1/11; G02B 1/115; G02B 3/005; G02B 3/0031; G02B 3/0056; G02B 3/0062; G02B 3/0012; G03H 1/00; G03H 1/028; G03H 1/0011; G03H 1/0244; G03H 1/02; G03H 1/0248; G03H 1/26; G03H 1/268; G03G 1/16; G11B 7/0065; G11B 7/24044; G11B 7/1353; B42D 15/0026; B42D 15/10; B42D 15/105; B42D 15/0013; G03B 35/00–12; G03B 35/20; G03B 31/06; G03B 31/00

See application file for complete search history.

(56) References Cited

U.S. PATENT DOCUMENTS

| | | | | |
|---|---|---|---|---|
| 9,807,376 B2* | 10/2017 | Jin | ............... | G02B 27/2214 |
| 2008/0316379 A1* | 12/2008 | Zuidema | ............ | H04N 13/305 |
| | | | | 349/15 |
| 2014/0192047 A1* | 7/2014 | Mishima | ............ | H04N 13/305 |
| | | | | 345/419 |
| 2015/0070478 A1* | 3/2015 | Wei | ............ | H04N 13/31 |
| | | | | 348/60 |

* cited by examiner

AUTOSTEREOSCOPIC 3-DIMENSIONAL DISPLAY

CROSS-REFERENCE TO RELATED APPLICATIONS

This application claims the priority benefit of Korea Patent Application No. 10-2016-0162358 filed on Nov. 30, 2016 in the Republic of Korea, which is incorporated herein by reference for all purposes as if fully set forth herein.

BACKGROUND

Technical Field

The present disclosure relates to an autostereoscopic three-dimensional (3D) display in which the multi view structure is configured by using a lenticular lens (also referred to hereinafter as a 'lenticular lens type'). In particular, the present disclosure relates to a lenticular lens type autostereoscopic 3D display representing high quality 3D images in which the brightness differences between the view areas are uniformed regardless of the tolerances of the manufacturing process.

Description of the Related Art

Due to the development of the stereoscopic image display technologies, a stereoscopic image reproducing technique is applied to a display device such as a television or monitor, so that anyone can appreciate a stereoscopic image anywhere. A stereoscopic image display may be defined as a system for artificially reproducing a 3D image.

The reason why a person feels visually stereoscopic is because of binocular disparity, which is caused by the fact that the eyes are separated apart 65 mm in the horizontal direction. When a person's eyes observe a thing, because of binocular parallax, each of the two eyes see different images, respectively, viewed from a slightly different angle. As these two images are sent to the brain through the retina, the brain can recognize the stereoscopic image by precisely combining these two images.

The autostereoscopic 3D display generates a virtual stereoscopic effect through a design that displays both the left eye image and the right eye image in the two-dimensional display according to the mechanism of the binocular disparity, and sends them to the left eye and the right eye, respectively. As the methods for realizing binocular parallax, a spectacle type (or glasses type) display and a non-spectacle type (or non-glasses type) display have been developed.

In the non-spectacle type display (or 'autostereoscopic 3D display'), the left eye image and the right eye image are displayed at the same time, and the optical axes of these two images are separated from each other. These images are provided to the left eye and the right eye, respectively. The non-spectacle type display may be divided into the parallax barrier system, the lenticular lens system and the integral photography system. In the parallax barrier system, a vertical grid-like aperture is disposed on the front of the display to separate the left eye image and the right eye image. In the lenticular lens system, a lens film in which a plurality of the semi-cylindrical lenses is continuously arrayed is attached to a front surface of the display to provide the left eye image and the right eye image. The integral photography system uses a dragonfly-eye-shaped lens plate to separate the left eye image and the right eye image.

Referring to FIG. 1, a lenticular lens type autostereoscopic 3D display according to the related art is discussed. FIG. 1 is a plane view illustrating the structure of a lenticular lens type autostereoscopic 3D display according to the related art. FIG. 1 shows the case in which the autostereoscopic 3D display includes 7 view areas separated from each other by the lenticular lens that is attached on the display panel with a 1/3 delta design.

Referring to FIG. 1, the lenticular type autostereoscopic 3D display according to the related art comprises a display panel DP and a lens film LF disposed on the front surface of the display panel DP. The display panel DP includes a plurality of pixels PxL arrayed in a matrix manner. At each pixel PXL, an aperture area AP is defined. The aperture area AP is the area for representing the color and brightness allocated at the pixel PXL. For example, the aperture area AP may be defined as the area representing any one color of the red color R, the green color G and the blue color B. Other areas of the display panel 100 excepting the aperture area AP are covered by the black matrix.

The display panel DP may be a flat display panel such as the liquid crystal display panel or the organic light emitting diode display panel. The display panel DP may further include various elements such as a gate line, a data line, a thin film transistor and so on, as well as the pixel PXL. Here, for convenience, these elements of the display panel DP would not be explained.

The lens film LF includes a plurality of lenticular lenses SLNs having a predetermined width. For example, a plurality of semi-cylindrical lenticular lenses is continuously arrayed. Further, the lenticular lens SLN is slanted at a predetermined angle with an inclination. Here, the slanted (or inclined) angle of the lenticular lens SLN is decided by the 'delta' value.

For the case of 1/3 delta structure as shown in FIG. 1, the pixels for the same view area are assigned at every one pixel in the horizontal direction and at every three pixels in the vertical direction. Under this condition, as the width of one lenticular lens SLN is covering to the width of three pixels PXL, one lenticular lens SLN has seven view areas V1 to V7 separated from each other. The pixels allocated at any one view area V1 to V7 represent one kind of view image. The number written at each aperture area AP means the kind of the view area V1 to V7 allocated at the aperture area AP.

As shown in FIG. 1, the aperture areas AP allocated to the first view area V1 represent the first view image. The aperture areas AP allocated to the second view area V2 represent the second view image. In this manner, the k-th view image Vk is displayed on the aperture area AP allocated to the k-th view area Vk. Here, 'k' is an integer number from 1 to 7.

FIGS. 2A and 2B are schematic diagrams illustrating a mechanism for displaying an object OBJ as a stereoscopic image.

Referring to FIG. 2A, different images are seen according to the direction in which the object OBJ is observed. The stereoscopic image of the object is divided into the seven view areas (multi-view area) including V1 to V7. The $k^{th}$ image Sk is shown at the $k^{th}$ view area Vk. Here, k is the integer number from 1 to 7. The first image S1 is observed (or displayed) at the first view area V1, the second image S2 is observed at the second view area V2, the third image S3 is observed at the third view area V3, and the seventh image S7 is observed at the seventh view area V7.

When the left eye of the observer is located at the first view area V1 and the right eye of the observer is located at the second view area V2, the left eye recognizes the first image S1 and the right eye recognizes the second image S2. Then by combining this binocular disparity, the observer's brain perceives the object OBJ stereoscopically.

Referring to FIG. 2B, the lenticular lens type autostereoscopic 3D display realizes the stereoscopic effect or mechanism using a flat panel display. In the flat panel display shown in FIG. 1, the seven view areas are separated by the lenticular lens SLN, and the pixels PXL allocated at each view area display the image associated to each view area.

As shown in FIG. 2B, each of the seven images S1 to S7 is provided to each of the seven view areas V1 to V7 separated by the lenticular lens SLN, respectively. When a person observes the display at the position L1, the left eye is located at the first view area V1 and the right eye is located at the second view area V2. Then, the observer can enjoy the same stereoscopic feeling as that of looking the object OBJ at the position L1 in FIG. 2A. When the person moves to the position L4, the left eye L is located at the fourth view area V4 and the right eye R is located at the fifth view area V5. Then, observer can enjoy the same stereoscopic feeling as that of looking the object OBJ at the position L4 in FIG. 2A.

In the process of manufacturing the display panel having this structure, the luminance unevenness may occur due to the manufacturing process tolerance. The luminance unevenness is recognized as a bright line or a dark line when a person views a stereoscopic image while moving. The luminance unevenness hinders the observation of the normal stereoscopic image. Therefore, in the lenticular lens type autostereoscopic 3D display, it is necessary to supplement the design so that the uniform luminance is maintained, even if the observing position is changed.

SUMMARY

In order to address the above mentioned drawbacks, the purpose of the present disclosure is to provide a lenticular lens type autostereoscopic 3D display in which the luminance uniformity is ensured as the viewing position is moved.

In order to accomplish the above purpose, the present disclosure provides an autostereoscopic 3D display comprising a display panel including a plurality of pixels, and an aperture area disposed at each pixel; and a lens film disposed on a front surface of the display panel and including a plurality of lenticular lenses, the lenticular lenses having a slanted axis and continuously arrayed along to a lateral direction, wherein the aperture area includes a parallelogram shape, and wherein the slanted axis is parallel with any one diagonal axis of the aperture area.

In one embodiment, the slanted axis is parallel to a first diagonal axis straightly connecting from a right-upper corner point to a left-lower corner point of the aperture area.

In one embodiment, the slanted axis is parallel to a second diagonal axis straightly connecting from a left-upper corner point to a right-lower corner point of the aperture area.

In one embodiment, any one lenticular lens includes n view areas where n is a natural number, each of the n view areas has a strip shape parallel with the slanted axis and has a view width, the view widths of the n view areas have a same value, and any one aperture area disposed as corresponding to any one of the n view areas.

In one embodiment, the aperture areas disposed at a $k^{th}$ view area are disposed at the pixel areas representing a $k^{th}$ video image, where k is one natural number of 1 to n.

In one embodiment, an aperture width defined as the lateral width of the aperture area corresponds to the view width.

In one embodiment, the diagonal axis of the aperture area is parallel with the slanted axis at a center of the view width.

In one embodiment, n is an even natural number, and the pixel areas having the aperture areas corresponding to a $m^{th}$ view area and a $(m+1)^{th}$ view area provide a same image, where m is an odd natural number less than n.

The present disclosure also provides a lenticular lens type autostereoscopic 3D display that provides the 3D images by separating multi views generated by the pixel area on the display panel using a lens film in which a plurality of lenticular lenses having a plurality of the view areas is arrayed in series. Particularly, when each of the apertures allocated at each of the pixels is disposed as corresponding to each of the view areas of the lenticular lens, the slanted axis of the lenticular lens is parallel to the diagonal axis of the aperture area. As a result, when observing the stereoscopic image with moving over the whole display area, there is no luminance variation. The lenticular lens type autostereoscopic 3D display according to the present disclosure provides a natural and/or smooth stereoscopic image without remarkable variations on the luminance as the observer moves across the display area.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

In the drawings.

DETAILED DESCRIPTION OF THE EMBODIMENTS

Figure 1:
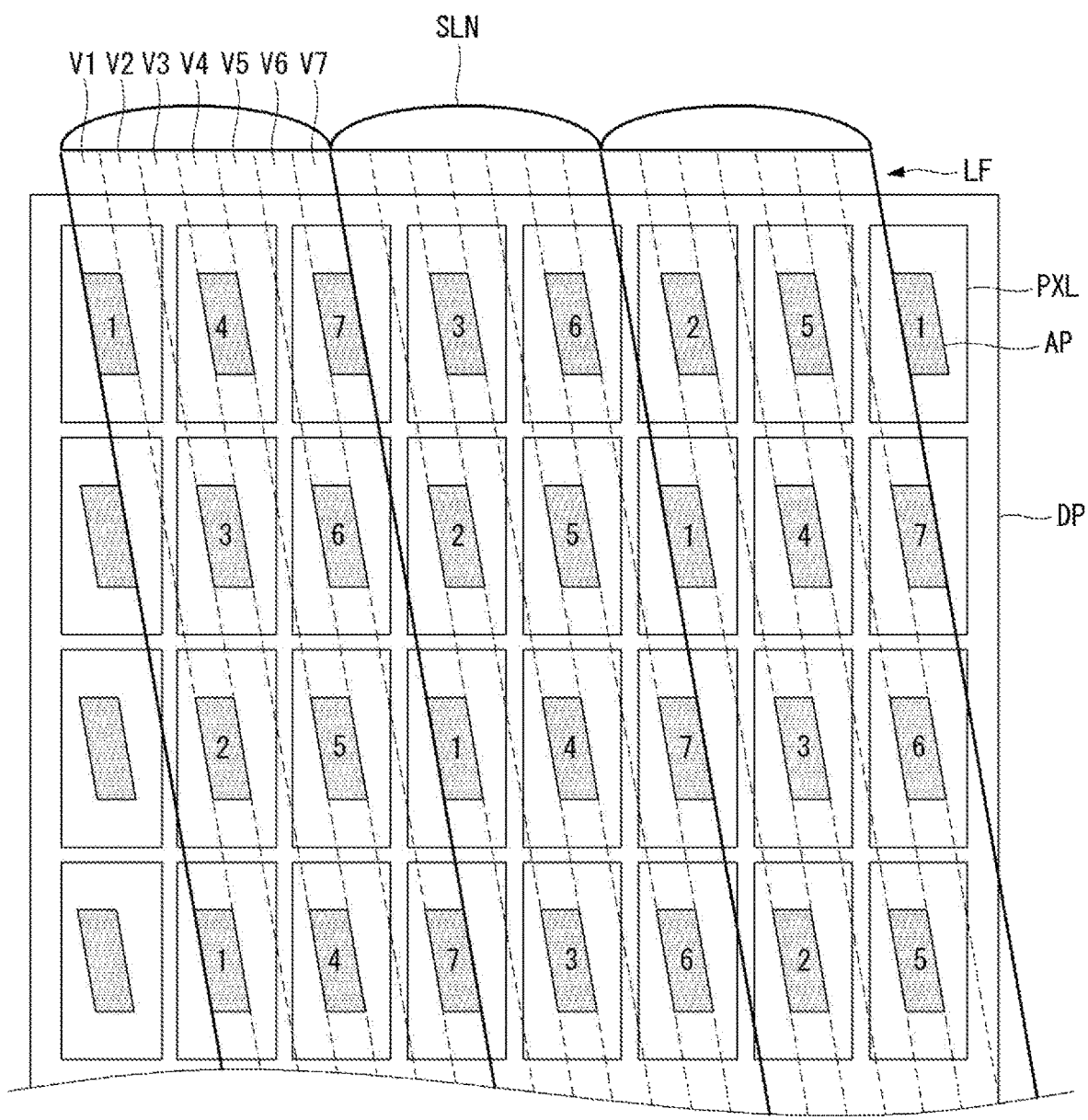
FIG. 1 is a plane view illustrating the structure of a lenticular lens type autostereoscopic 3D display according to the related art.

Referring to attached figures, preferred embodiments of the present disclosure will be explained. Like reference numerals designate like elements throughout the detailed description. However, the present disclosure is not restricted by these embodiments but can be applied to various changes or modifications without changing the technical spirit. In the following embodiments, the names of the elements are selected by considering the easiness for explanation so that they may be different from actual names.

First Embodiment

Figure 3:
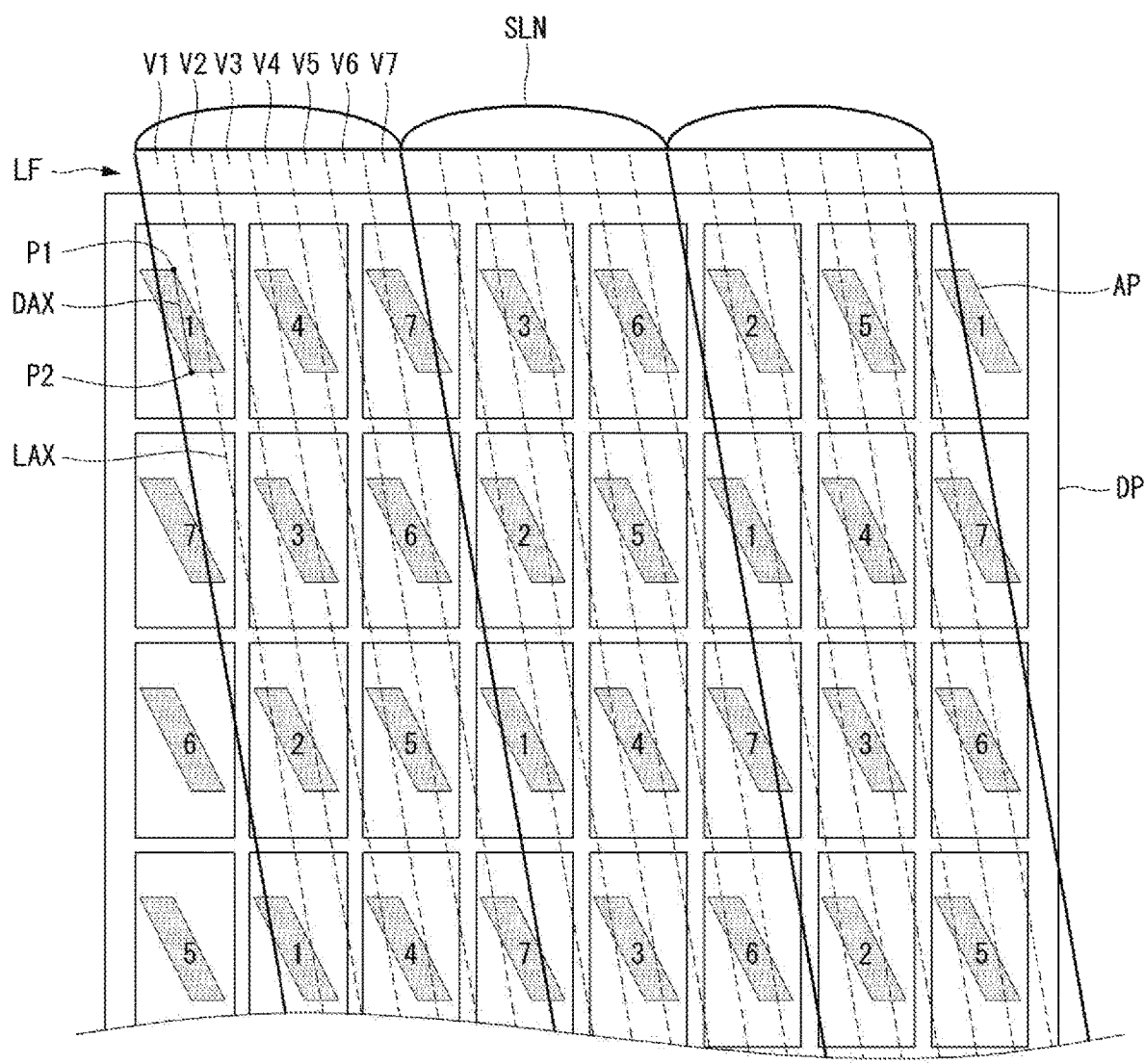
FIG. 3 is a plane view illustrating a lenticular lens type autostereoscopic 3D display according to a first embodiment of the present disclosure.

Hereinafter, referring to FIG. 3, the first embodiment of the present disclosure will be explained. FIG. 3 is a plane view illustrating a lenticular lens type autostereoscopic 3D display according to the first embodiment of the present disclosure. All the components of the lenticular lens type autostereoscopic 3D display according to all embodiments of the present disclosure are operatively coupled and configured.

Referring to FIG. 3, the lenticular lens type autostereoscopic 3D display according to the first embodiment of the present disclosure comprises a display panel DP and a lens film LF disposed on the upper surface of the display panel DP. The display panel DP includes a plurality of the pixels PXL arrayed in a matrix manner. Further, the display panel DP includes various elements for driving the pixels PXL. Each pixel PXL includes one aperture area AP.

The lens film LF includes a plurality of lenticular lenses SLN having a semi-cylindrical shape and disposed continuously in lateral direction. The lenticular lenses SLN may be disposed on the upper surface of the display panel DP as aligned as having a predetermined slanted or tilted angle. Here, the inclination (or the slanted angle) may be represented by the unit of pixel PXL. For example, in the 1/3 delta structure, the inclination of the lenticular lens SLN may be same with the value, (width of the pixel)/(3×length of the pixel). That is, the delta value may be represented as 'n/m', where n is a natural number, and m is a natural number larger than n.

The lenticular lens includes k view areas separated from each other. The view areas are defined as a plurality of segments having the same view width are arrayed in serial. At each view area has a plurality of the aperture areas AP. The pixel areas PXL allocated at the same view area represent the same video image. The view area division may be decided by the design method. Here, various methods for dividing (or separating) the view areas will not be mentioned.

Here, the view width defined at the lenticular lens means the distance between the left slanted lines and the right slanted line of one view area. Generally, the distance between two slanted lines are defined by the length of the line perpendicular to these slanted lines. However, the view width is defined as the lateral (or horizontal) length (length of the line parallel to the X-axis) between two slanted lines defining one view area. Further, two lines defining one view area are parallel with the slanted axis LAX of the lenticular lens SLN.

FIG. 3 shows the case that the lenticular lens divides 7 view areas. The pixels allocated to each view area V1 to V7 display unique images different from each other. That is, the display shown in FIG. 3 represents 7 images observing at 7 directions, at the same time. These 7 images are separated by the lenticular lens and then provided to the 7 view areas, respectively. According to the view-map design, the number of the view areas may be changed. The number of the view areas may be larger than 7 or less than 7.

Figure 2A:
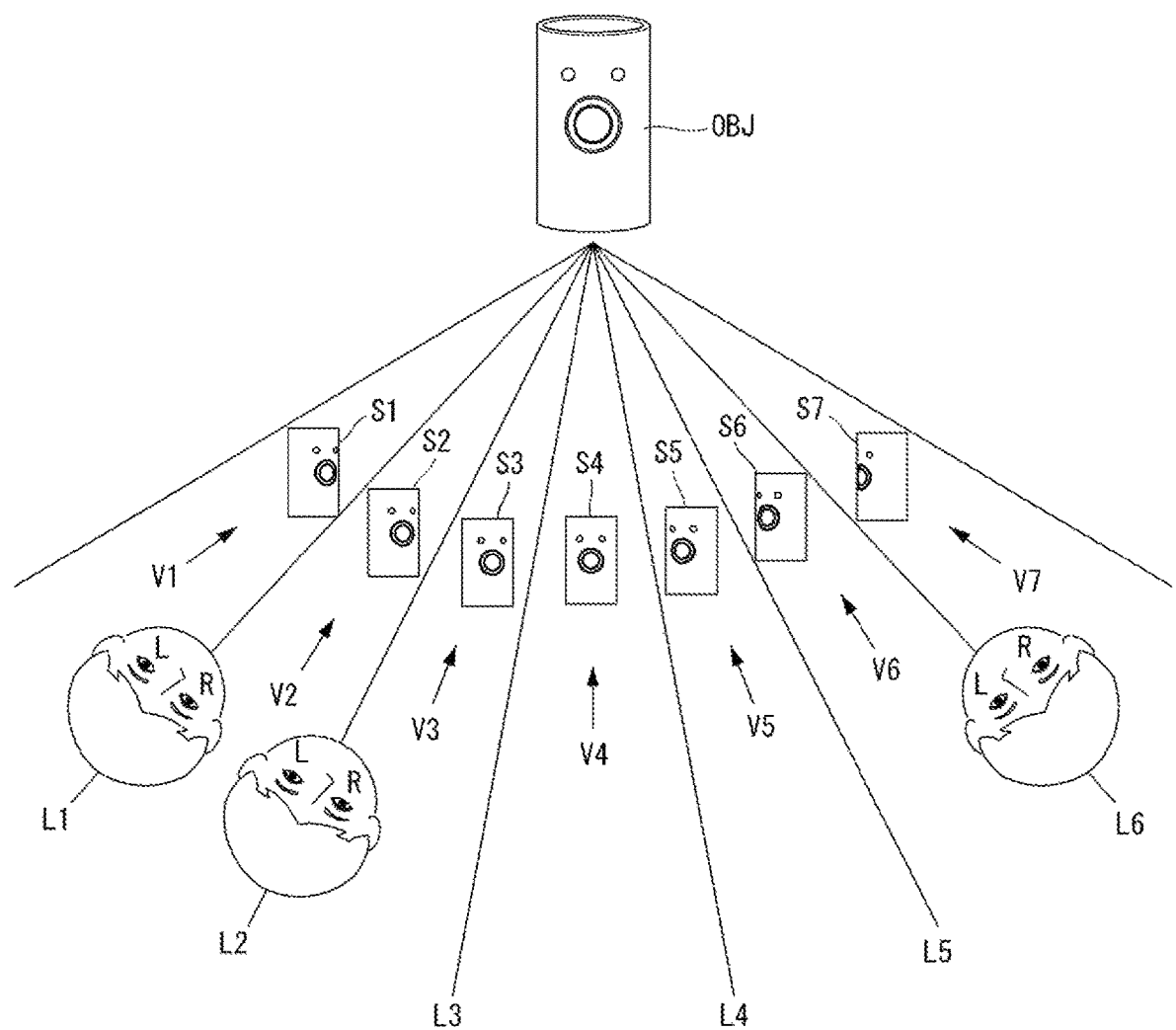
FIGS. 2A and 2B are schematic diagrams illustrating a mechanism for displaying an object as a stereoscopic image according to the related art.
Figure 2B:
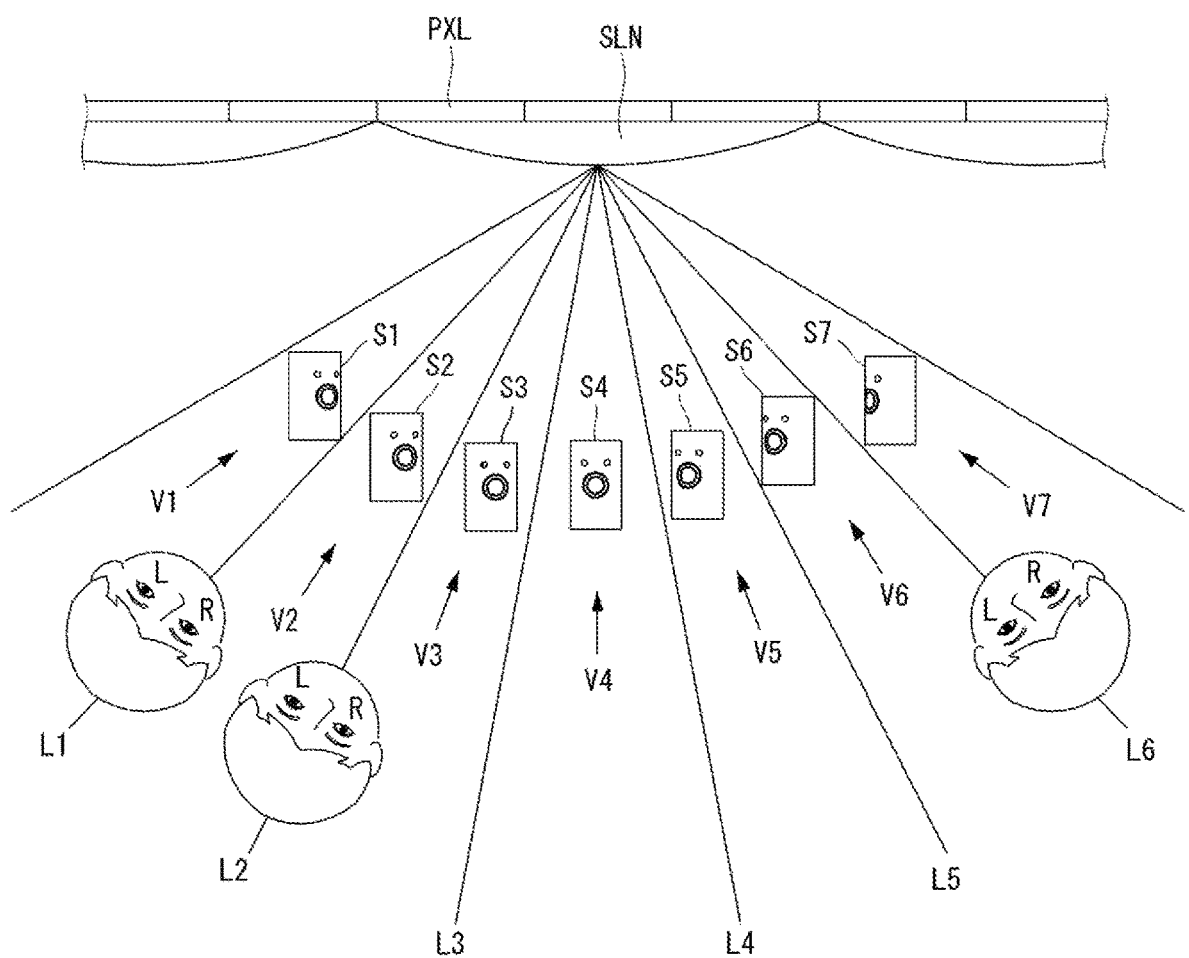

The number written on each aperture area AP in FIG. 3 means the number of image. For example, the aperture area AP having number '1' represents the first image i.e., S1 of FIG. 2B. The aperture area AP providing the first image S1 is allocated at the first view area V1. The aperture area AP having number '2' represents the second image S2. The aperture area AP providing the second image S1 is allocated at the second view area V2. Like this manner, the aperture areas AP providing any one image among the first image to the seventh image are allocated at any one of the seven view areas V1 to V7.

Figure 4:
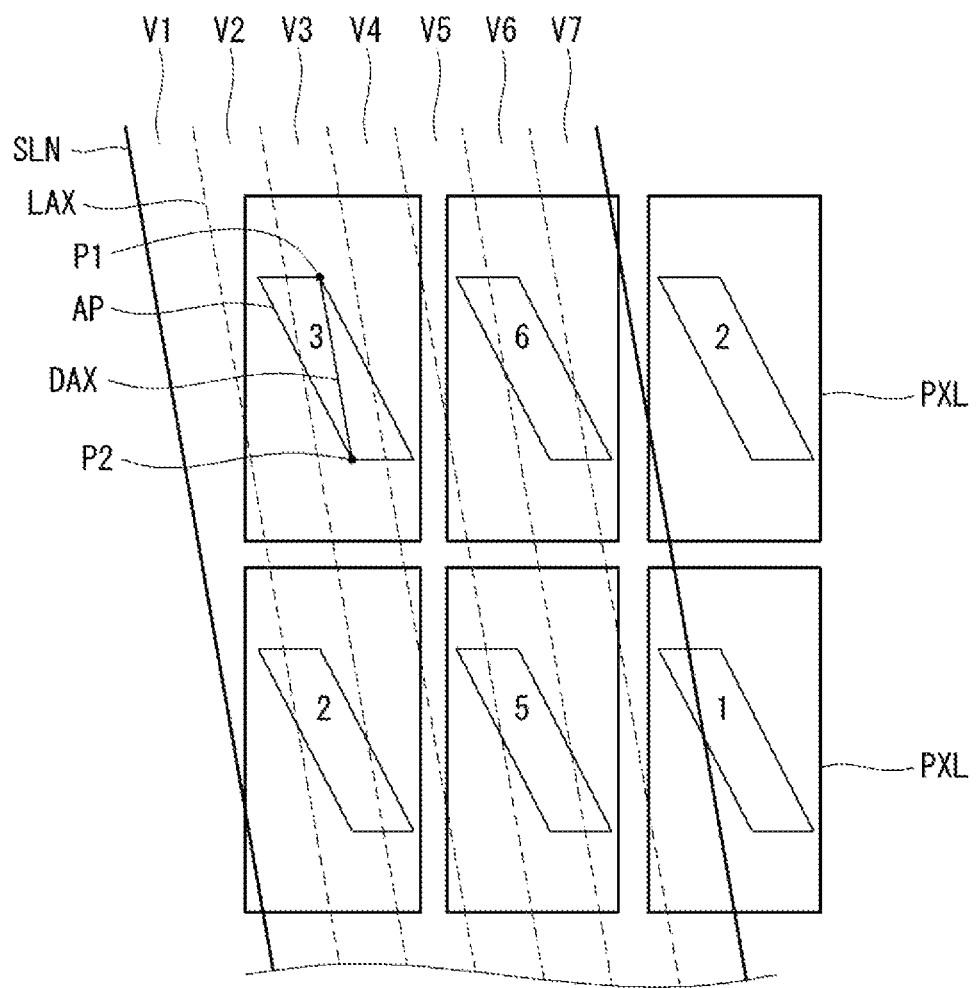
FIG. 4 is an enlarged plane view illustrating the structures of the aperture area and the lenticular lens, according to the first embodiment of the present disclosure.

One of many key features of the autostereoscopic 3D display according to the present disclosure is on the structure of the aperture area AP. There are various embodiments according to the structure of the aperture area AP. In the first embodiment, referring to FIG. 4, the detail structure of the aperture area AP will be explained. FIG. 4 is an enlarged plane view illustrating the structures of the aperture area and the lenticular lens, according to the first embodiment of the present disclosure.

Referring to FIG. 4, in each pixel PXL, one aperture area AP is defined. The aperture area AP has a parallelogram shape. It is preferable that the lateral width of the aperture area AP is same with the lateral width of the view area defined in the lenticular lens SLN.

One of the relevant features of the present disclosure is on the relationship between the aperture area AP and the slanted axis LAX of the lenticular lens SLN. It is preferable that the slanted axis LAX of the lenticular lens SLN is parallel to any one diagonal axis of the aperture area AP. The dash lines drawn in the lenticular lens SLN are imaginary lines illustrating the view areas. These imaginary lines are parallel with the slanted axis LAX of the lenticular lens SLN. For example, the slanted axis LAX is parallel with the diagonal axis DAX straightly connecting from the left-upper corner point P1 to the right-lower corner point P2 of the aperture area AP.

Referring to FIG. 4, any one aperture area AP is allocated at any one view area defined in the lenticular lens SLN, further it is overlapped with neighboring view areas located at the right side and the left side. Due to this overlapping structure, even if the manufacturing process tolerance is affected to the manufactured shapes of the aperture areas, the lenticular lens type autostereoscopic 3D display according to the present disclosure has the robust structure in which the luminance difference does not or may not occur.

Second Embodiment

Figure 5:
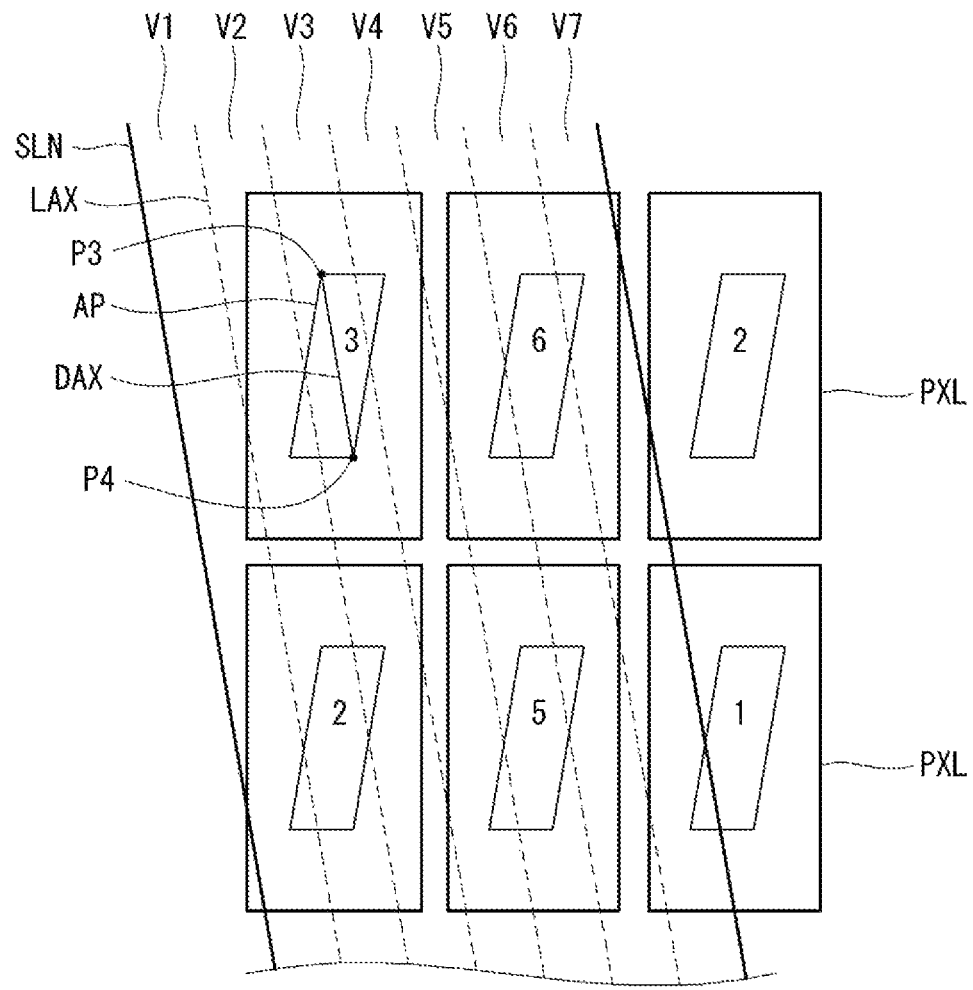
FIG. 5 is an enlarged plane view illustrating a relationship between the structure of an aperture and the structure of the lenticular lens, according to a second embodiment of the present disclosure.

Hereinafter, referring to FIG. 5, the second embodiment of the present disclosure will be explained. FIG. 5 is an enlarged plane view illustrating a relationship between the structure of an aperture and the structure of the lenticular lens, according to the second embodiment of the present disclosure.

Referring to FIG. 5, an aperture area AP is defined or allocated in one pixel PXL. The aperture area AP has the parallelogram shape. It is preferable that the lateral width of the aperture area AP is same with the lateral width of one view area defined in the lenticular lens SLN.

It is preferable that the slanted axis LAX of the lenticular lens SLN is parallel to or corresponding to any one diagonal axis of the aperture area AP. In FIG. 5, the dotted lines inside of the lenticular lens SLN are the imaginary lines for dividing the view areas. These dotted lines are parallel to the slanted axis LAX of the lenticular lens SLN. It is preferable that the slanted line LAX is parallel to the diagonal axis DAX straightly connecting from right-upper corner point P3 to the left-lower corner point P4 of the aperture area AP.

Referring to FIG. 5, any one aperture area AP is allocated at any one view area defined in the lenticular lens SLN, further it is overlapped with neighboring view areas located at the right side and the left side. Due to this overlapping structure, even if the manufacturing process tolerance is affected to the manufactured shapes of the aperture areas, the lenticular lens type autostereoscopic 3D display according to the present disclosure has the robust structure in which the luminance difference is not occurred.

Figure 6:
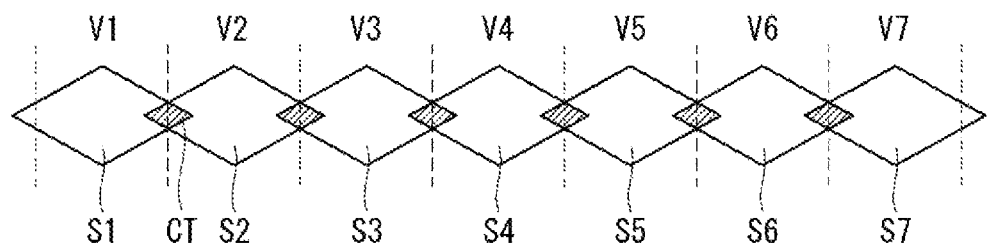
FIG. 6 is a diagram illustrating a displacement of the viewing diamonds (or viewing ranges) of the lenticular lens type autostereoscopic 3D display according to the first and the second embodiments of the present disclosure.

Hereinafter, referring to FIG. 6, the robust structure of the lenticular lens type autostereoscopic 3D display according to the first and the second embodiments of the present disclosure will be explained. FIG. 6 is a diagram illustrating a displacement of the viewing diamonds (or viewing ranges) of the lenticular lens type autostereoscopic 3D display according to the first and the second embodiments of the present disclosure.

FIG. 6 is an imaginary figure illustrating how the view areas are provided to the observer. The pixel areas allocated at the first view area V1 provide the first image S1 at proper distance. The pixel areas allocated at the second view area V2 provide the second image S2. Like that, the pixel areas allocated at the $n^{th}$ view area Vn provide the $n^{th}$ image Sn. Each of the viewing ranges providing each of the images is shown as the diamond shape.

As shown in FIG. 5, each of the aperture areas AP allocated at each of the view areas is overlapped with neighboring view areas. Therefore, the images provided to the observer also have the overlapped areas between two neighboring images. These overlapped areas are defined as the cross-talk area CT. The n images are provided as being apart from each other with the binocular distance (length between two eyes of human). For example, the distance between the center of the first image S1 and the center of the second image S2 is corresponding to the binocular distance, 63 mm. The definition of the binocular distance may be somewhat different, but it would be set within the range of approximately 60 to 65 mm. Here, 63 mm for the binocular distance is used.

It is preferable that the range of the cross-talk area CT is not overlapped with the center portion of the view area of the image. For example, in the first and the second embodiments, the diagonal axis DAX of the aperture area AP is located at the center of the view area Vk, the width of the aperture area AP is corresponding to the width of the view area Vk. So that, the overlapped area with the neighboring view area AP over the view area Vk would be minimized. Thanks to this structure, the sizes of the cross-talk areas CT are same over the whole display panel DP. As the overlapped areas having the same size are regularly arrayed across the display panel, the luminance of the display would be equally detected as the observer moves across the display panel.

In the lenticular lens type autostereoscopic 3D display according to the first and the second embodiments of the present disclosure, the luminance difference is less than 2% even if an observer moves his/her position. The meaning of that the luminance difference is lowered is that the autostereoscopic 3D display according to the present disclosure can provide superior video quality in which there in no luminance difference as the observer moves his/her position across the display panel.

The main reason for the high luminance difference may be the manufacturing process tolerance (or margin). The luminance differences are raised between the neighboring two aperture areas.

In the first and the second embodiments of the present disclosure, the slanted axis LAX of the lenticular lens SLN is parallel with any one diagonal axis DAX of the aperture area AP. The cross-talk areas CT formed between two neighboring view areas are uniformly distributed over the whole images provided from the display panel.

For reference, in the autostereoscopic 3D display shown in FIG. 1 according to the related art, the luminance difference due to the manufacturing process tolerance is measured 29.9% at least. In the related arts, it is very hard to lower the luminance difference under 20% even if the manufacturing process tolerance is reduced. On the contrary, in the autostereoscopic 3D display shown in FIGS. 4 and 5 according to the first and the second embodiments of the present disclosure, the luminance difference is 2% or lower, remarkably enhanced from the related art.

Third Embodiment

Figure 7:
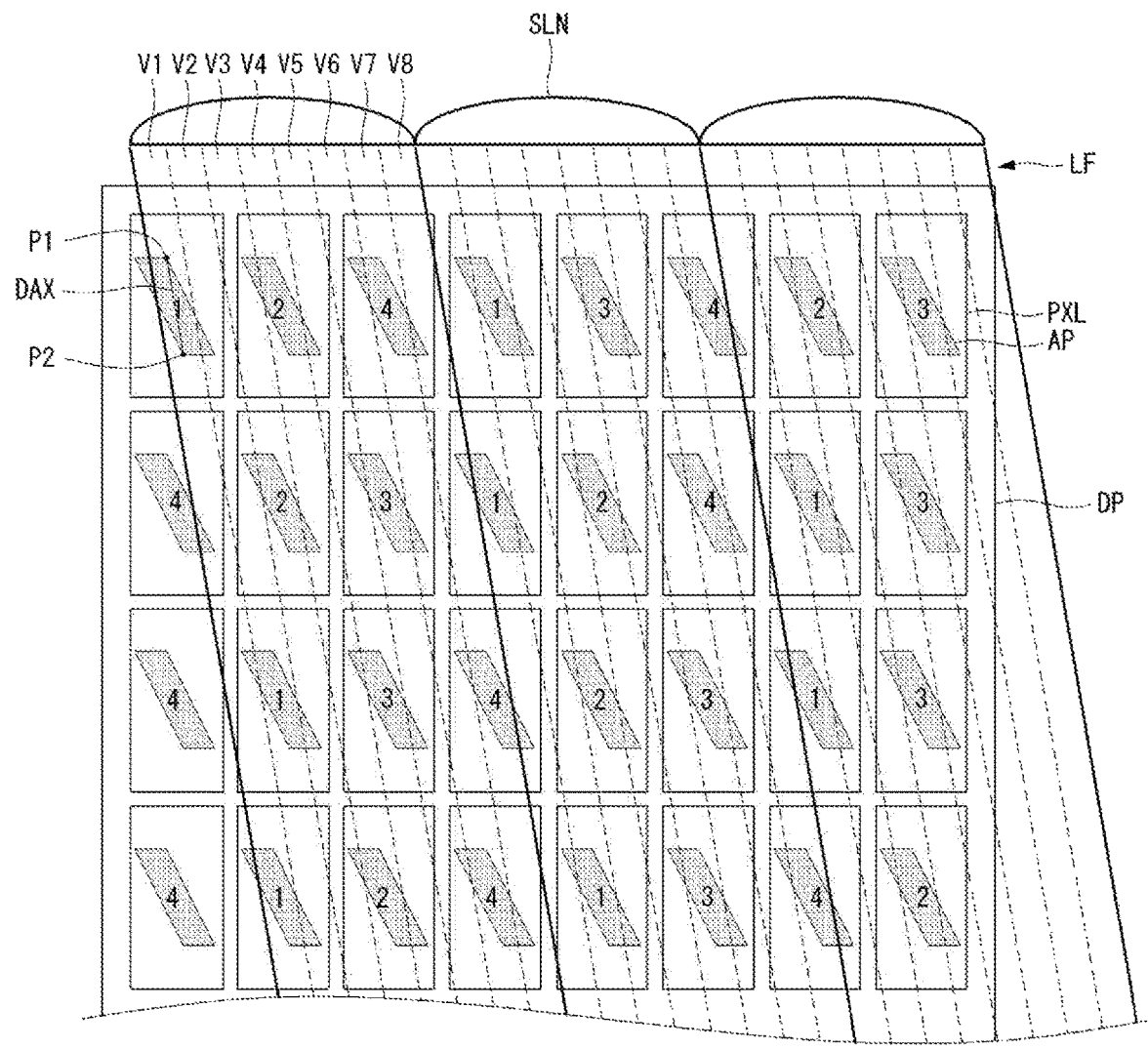
FIG. 7 is a plane view illustrating a lenticular lens type autostereoscopic 3D display according to a third embodiment of the present disclosure.

Hereinafter, referring to FIG. 7, the third embodiment of the present disclosure will be explained. In the third embodiment, a lenticular lens type autostereoscopic 3D display in which the cross-talk area would be much more reduced will be discussed. FIG. 7 is a plane view illustrating a lenticular lens type autostereoscopic 3D display according to the third embodiment of the present disclosure.

Referring to FIG. 7, the lenticular lens type autostereoscopic 3D display according to the third embodiment of the present disclosure comprises a display panel DP and a lens film LF disposed on the upper surface of the display panel DP. The display panel DP includes a plurality of the pixels PxL arrayed in a matrix manner. Further, the display panel DP includes various elements for driving the pixels PXL. Each pixel PXL includes one aperture area AP.

The lens film LF includes a plurality of lenticular lenses SLN having a semi-cylindrical shape and disposed continuously in lateral direction. The lenticular lenses SLN may be disposed on the upper surface of the display panel DP as aligned as having a predetermined slanted or tilted angle. Here, the inclination (or the slanted angle) may be represented by the unit of pixel PXL. For example, in the 1/3 delta structure, the inclination of the lenticular lens SLN may be same with the value, (width of the pixel)/(3×length of the pixel). That is, the delta value may be represented as 'n/m', n is a natural number, and m is a natural number larger than n.

The lenticular lens includes k view areas separated from each other. The view areas are defined as a plurality of segments having the same view width are arrayed in serial. At each view area has a plurality of the aperture areas AP. The pixel areas PXL allocated at the same view area represent the same video image. The view area division may be decided by the design method.

Specifically, in the third embodiment, one lenticular lens SLN are divided into even numbered view areas. For example, FIG. 7 shows the case in which one lenticular lens SLN is divided into 8 view areas. The reason for having the even numbered view areas is that the ratio of the cross-talk area is minimized by allocating one image to the neighboring two view areas.

In FIG. 7, the pixels allocated to each view area V1 to V8 display unique images different from each other. That is, the display shown in FIG. 7 represents 8 images observing at 8 directions, at the same time. These 8 images are separated by the lenticular lens and then provided to the 8 view areas, respectively. Further, the pixels allocated at two neighboring view areas provide the same image.

The number written on each aperture area AP in FIG. 7 means the number of image. For example, the pixel areas allocated at the first view area V1 and the second view area V2 represent the first image S1. The pixel areas allocated at the third view area V3 and the fourth view area V4 represent the second image S2. The pixel areas allocated at the fifth view area V5 and the sixth view area V6 represent the third image S3. The pixel areas allocated at the seventh view area V7 and the eighth view area V8 represent the fourth image S4.

Figure 8:
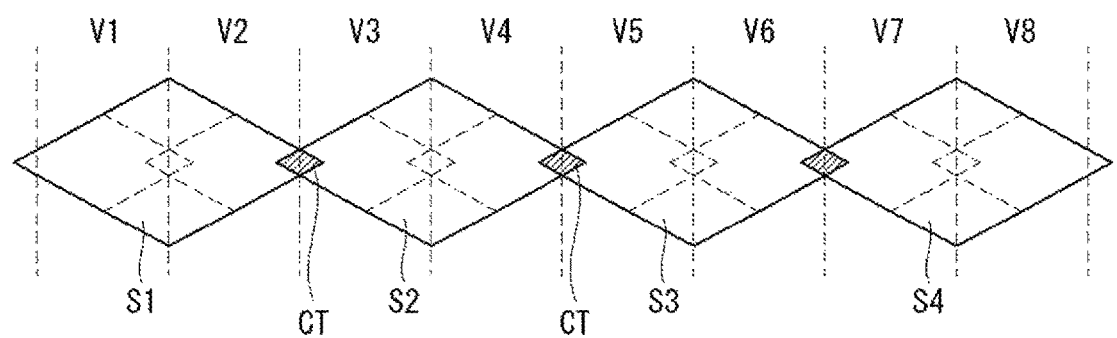
FIG. 8 is a diagram illustrating a displacement of the viewing diamonds (or viewing ranges) of the lenticular lens type autostereoscopic 3D display according to the third embodiment of the present disclosure.

Hereinafter, referring to FIG. 8, the robust structure of the lenticular lens type autostereoscopic 3D display according to the third embodiment of the present disclosure will be explained. FIG. 8 is a diagram illustrating a displacement of the viewing diamonds (or viewing ranges) of the lenticular lens type autostereoscopic 3D display according to the third embodiment of the present disclosure.

FIG. 8 is an imaginary figure illustrating how the view areas are provided to the observer. The pixel areas allocated at the first view area V1 provide the first image S1 at proper distance. The pixel areas allocated at the second view area V2 provide the second image S2 (actually the first image S1, the reason will be in follows). Like that, the pixel areas allocated at the nth view area Vn provide the nth image Sn. Each of the viewing ranges providing each of the images is shown as the diamond shape.

In the third embodiment, the first image S1 is provided to the first view area V1 and the second view area V2. The second image S2 is provided to the third view area V3 and the fourth view area V4. The third image S3 is provided to the fifth view area V5 and the sixth view area V6. The fourth image S4 is provided to the seventh view area V7 and the eighth view area V8. Therefore, the actual images recognized by the observer are shown as the large diamonds in FIG. 8.

The distance between the center of the first image S1 and the center of the second image S2 is corresponding to the binocular distance, 63 mm. The definition of the binocular distance may be somewhat different, but it would be set within the range of approximately 60 to 65 mm. Here, 63 mm for the binocular distance is used.

In FIG. 8, the overlapped area between two small diamond areas represents the same image so that the overlapped area between two small diamond areas is not the cross-talk area. The overlapped areas between two large diamond areas are to be the cross-talk areas CT. Therefore, comparing with FIG. 6, the ratio of the cross-talk area CT in FIG. 8 is reduced in half or less (e.g., actually reduced to about 1/4).

In the third embodiment, the diagonal axis DAX of the aperture area AP is located at the center of the view area Vk, the width of the aperture area AP is corresponding to the width of the view area Vk. So that, the overlapped area with the neighboring view area AP over the view area Vk would be minimized. Thanks to this structure, the sizes of the cross-talk areas CT are same over the whole display panel DP. As the overlapped areas having the same size are regularly arrayed across the display panel, the luminance of the display would be equally detected as the observer moves across the display panel.

Further, by providing the same image to the two neighboring view areas, the ratio of the cross-talk area CT to the view area is much more reduced. The third embodiment provides a lenticular lens type autostereoscopic 3D display in which the cross-talk area would be much more reduced and the superior 3D video quality is ensured.

While the embodiments of the present disclosure have been described in detail with reference to the drawings, it will be understood by those skilled in the art that the disclosure can be implemented in other specific forms without changing the technical spirit or essential features of the disclosure. Therefore, it should be noted that the forgoing embodiments are merely illustrative in all aspects and are not to be construed as limiting the disclosure. The scope of the disclosure is defined by the appended claims rather than the detailed description of the disclosure. All changes or modifications or their equivalents made within the meanings and scope of the claims should be construed as falling within the scope of the disclosure.

What is claimed is:

1. An autostereoscopic three-dimensional (3D) display comprising:
a display panel including a plurality of pixels, and an aperture area disposed at each pixel; and
a lens film disposed on a front surface of the display panel and including a plurality of lenticular lenses, the lenticular lenses having a slanted axis and continuously arrayed along to a lateral direction,
wherein each of the plurality of lenticular lenses includes n view areas where n is a natural number,
wherein the aperture area is disposed corresponding to any one of the n view areas to be partially overlapped with view areas neighboring to both sides of the any one of the n view areas,
wherein the aperture area includes a parallelogram shape,
wherein the pixel is larger than the aperture area, and a longer side of the aperture area is slanted to a longer side of the pixel,
wherein the slanted axis of the lenticular lenses is parallel with a diagonal axis connecting farthest corners in the aperture area and slanted to the longer side of the aperture area and the longer side of the pixel,
wherein the diagonal axis of the aperture area is located at the center of the view area, and
wherein a width of the aperture area is the same as a width of one of the view areas.

2. The autostereoscopic 3D display according to the claim 1, wherein the slanted axis is parallel to the diagonal axis straightly connecting from a right-upper corner point to a left-lower corner point of the aperture area.

3. The autostereoscopic 3D display according to the claim 1, wherein the slanted axis is parallel to the diagonal axis straightly connecting from a left-upper corner point to a right-lower corner point of the aperture area.

4. The autostereoscopic 3D display according to the claim 1, wherein each of the n view areas having a strip shape parallel with the slanted axis and having a view width, and the view widths of the view areas having a same value.

5. The autostereoscopic 3D display according to the claim 4, wherein the aperture areas disposed at a kth view area are disposed at pixel areas representing a kth video image, where k is one of 1 to n.

6. The autostereoscopic 3D display according to the claim 4, wherein an aperture width defined as the lateral width of the aperture area corresponds to the view width.

7. The autostereoscopic 3D display according to the claim 4, wherein the diagonal axis of the aperture area is parallel with the slanted axis at a center of the view width.

8. The autostereoscopic 3D display according to the claim 4, wherein n is an even natural number, and
wherein the pixel areas having the aperture areas corresponding to a mth view area and a (m+1)th view area provide a same image, where m is an odd natural number less than n.

* * * * *